(12) United States Patent  (10) Patent No.: US 7,731,577 B2
Ricketts  (45) Date of Patent: Jun. 8, 2010

(54) ROTATING INLET FOR CROSS FLOW FAN

(75) Inventor: Jon E. Ricketts, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 747 days.

(21) Appl. No.: 11/479,685

(22) Filed: Jun. 30, 2006

(65) Prior Publication Data

US 2008/0004090 A1   Jan. 3, 2008

(51) Int. Cl.
  *A01F 12/48*  (2006.01)
(52) U.S. Cl. .................. 460/100; 415/53.1; 415/53.2
(58) Field of Classification Search ............. 460/97, 460/99, 100, 119; 56/12.8–13.4, DIG. 8; 415/53.1, 53.2
  See application file for complete search history.

(56) References Cited

U.S. PATENT DOCUMENTS

| 2,057,403 | A |   | 10/1936 | Vali et al. |
| 3,096,931 | A |   | 7/1963  | Eck |
| 3,116,238 | A |   | 12/1963 | Van Etten |
| 3,150,816 | A | * | 9/1964  | Laing ................... 415/53.1 |
| 3,152,876 | A | * | 10/1964 | Laing ..................... 34/619 |
| 3,161,348 | A | * | 12/1964 | Laing ................... 415/53.1 |
| 3,238,725 | A |   | 3/1966  | Ludin |
| 3,322,332 | A |   | 5/1967  | Laing |
| 3,840,022 | A | * | 10/1974 | Hahner .................. 460/100 |
| 4,251,356 | A |   | 2/1981  | Harte |
| 4,869,272 | A | * | 9/1989  | Ricketts et al. ......... 460/100 |
| 5,421,147 | A |   | 6/1995  | Holden et al. |
| 6,341,643 | B1 |  | 1/2002  | Osakabe |

FOREIGN PATENT DOCUMENTS

EP           489672 A1 *  6/1992

* cited by examiner

*Primary Examiner*—Alicia M Torres
(74) *Attorney, Agent, or Firm*—Michael G. Harms; John William Stader; Patrick M. Sheldrake

(57) ABSTRACT

A transverse fan assembly that includes a fan rotatably disposed in an air plenum for drawing air through an inlet opening and drivingly forcing air from an outlet opening defined by the air plenum, the inlet opening having an elongate, bladed, inlet rotor oriented on a rotational axis parallel to the fan, extending the length of the fan, and positioned proximate to the fan periphery to increase air flow from the outlet of the air plenum along the length of the fan while generating less noise.

5 Claims, 5 Drawing Sheets

US 7,731,577 B2

ROTATING INLET FOR CROSS FLOW FAN

BACKGROUND OF THE INVENTION

The present invention relates generally to agricultural harvesters and, more particularly, to agricultural combine harvesters with a transverse fan assembly having a noise-reducing, flow enhancing inlet structure.

Transverse fan assemblies used in agricultural combines are well known in the art. A typical agricultural combine includes a crop header apparatus which reaps planted grain stalks and then feeds the grain stalks to a threshing apparatus arranged within a body of the combine. The threshing apparatus functions to separate grain from material other than grain. As part of the threshing process, the grain is separated to fall or exit through openings in the threshing apparatus into the cleaning apparatus while material other than grain is discharged from the combine. Transverse fan assemblies provide air flow through sieves in the cleaning apparatus to separate grain from the smaller non-grain crop material sometimes called "chaff." Grain is collected within the combine while the chaff is discharged from the combine, partially aided by air flow from the fan assembly of the cleaning apparatus.

With the increased productivity demands on modern agricultural combines, cleaning capacity has become a limiting factor to overall harvesting performance of the combine. The most readily achieved method of increasing combine efficiency is by increasing the size of the cleaning area and the sieves to spread the crop materials across a wider area and in a thinner crop mat or veil which necessitates increased air flow through the cleaning area. Conventional methods for increasing air flow provided by a transverse fan of a given width require increasing the fan tip speed, whether by increasing the fan rotational speed, increasing fan diameter, or a combination of both. Unfortunately, these methods result in increased noise from the operating fan which increases overall noise level of the combine. Moreover, space limitations often preclude increasing fan diameter as a means to increase air flow.

One method for reducing fan noise is to provide a fan having angled blades. Transverse fans having straight blades generate considerable noise as each blade passes a straight plenum cutoff edge as the blade and the edge will be instantaneously adjacent for the entire length of the fan. Transverse fans having angled blades, such as that disclosed in U.S. Pat. No. 5,599,162, reduce noise by reducing the portion of the fan blade that passes a straight cutoff edge at any instant in time. There are limitations in the angle to which a transverse fan blade may be positioned beyond which air flow in the axial direction becomes problematic and affects air flow distribution uniformity from the fan outlet.

It would be a great advantage to provide an improved cross flow fan capable of providing increased air flow to meet the needs of higher capacity combines without increasing the operating noise level of the fan thereby overcoming the above problems and disadvantages.

SUMMARY OF THE INVENTION

Accordingly, it is an object of the present invention to provide an inlet rotor for a transverse fan assembly that includes a fan rotatably disposed in an air plenum for drawing air through an inlet opening and drivingly forcing air from an outlet opening defined by the air plenum providing a substantially even flow of air from the outlet of the air plenum along the length of the fan.

It is a further object of the present invention to provide a transverse fan assembly plenum having a rotating, bladed inlet rotor arranged in parallel with the fan and situated at the trailing plenum inlet opening edge to improve the output flow of air from the length of the fan assembly.

It is a further object of the present invention to provide a transverse fan assembly having a bladed, rotating inlet rotor situated at the plenum inlet opening edge to reduce noise caused by the interaction of the fan blades and the inlet opening edge.

It is a further object of the present invention to provide a bladed, rotating inlet rotor situated at the plenum inlet opening edge of a transverse fan assembly interacting with a transverse fan having fan blades arranged in a chevron-like configuration that simultaneously increases air flow while reducing noise generated by the fan assembly.

It is a still further object of the present invention to provide a transverse fan assembly having a cooperating fan blade orientation and plenum inlet rotor capable of increasing air flow to the cleaning assembly of an agricultural combine.

It is a still further object of the present invention to provide a transverse fan assembly having a cooperating fan blade orientation and plenum inlet rotor capable of reducing the noise level of the fan used in the cleaning assembly of an agricultural combine.

It is a still further object of the present invention to provide an inlet rotor for a transverse fan assembly that is durable in construction, inexpensive of manufacture, carefree of maintenance, easily assembled, and simple and effective to use.

These and other objects are achieved by providing a transverse fan assembly that includes an elongate, bladed, inlet rotor oriented on a rotational axis parallel to the fan and extending the length of the fan, and a fan rotatably disposed within an air plenum for drawing air through an inlet opening and drivingly forcing air from an outlet opening defined by the air plenum, the fan having elongated fan blades that slant toward a peripheral center portion of the fan forming a chevron-like configuration between opposite ends of the fan, whereby the interaction of the fan and the inlet rotor increase air flow and improve air distribution from the outlet of the air plenum while generating less noise.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

The terms "grain," "straw," "chaff" and "tailings" are used principally throughout this specification for convenience and it is to be understood that these terms are not intended to be limiting. Thus "grain" refers to that part of the crop material which is threshed and separated from the discardable part of the crop material, which is referred to as "straw." Incompletely threshed crop material is referred to as "tailings." The smallest pieces of tailings are referred to as "chaff." Also, any reference herein to the terms "left" or "right," "forward" or "rearward," or "top" or "bottom" are used as a matter of mere convenience, and are determined by standing at the rear of the machine facing in its normal direction of travel; use of these terms should not be construed as limiting. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
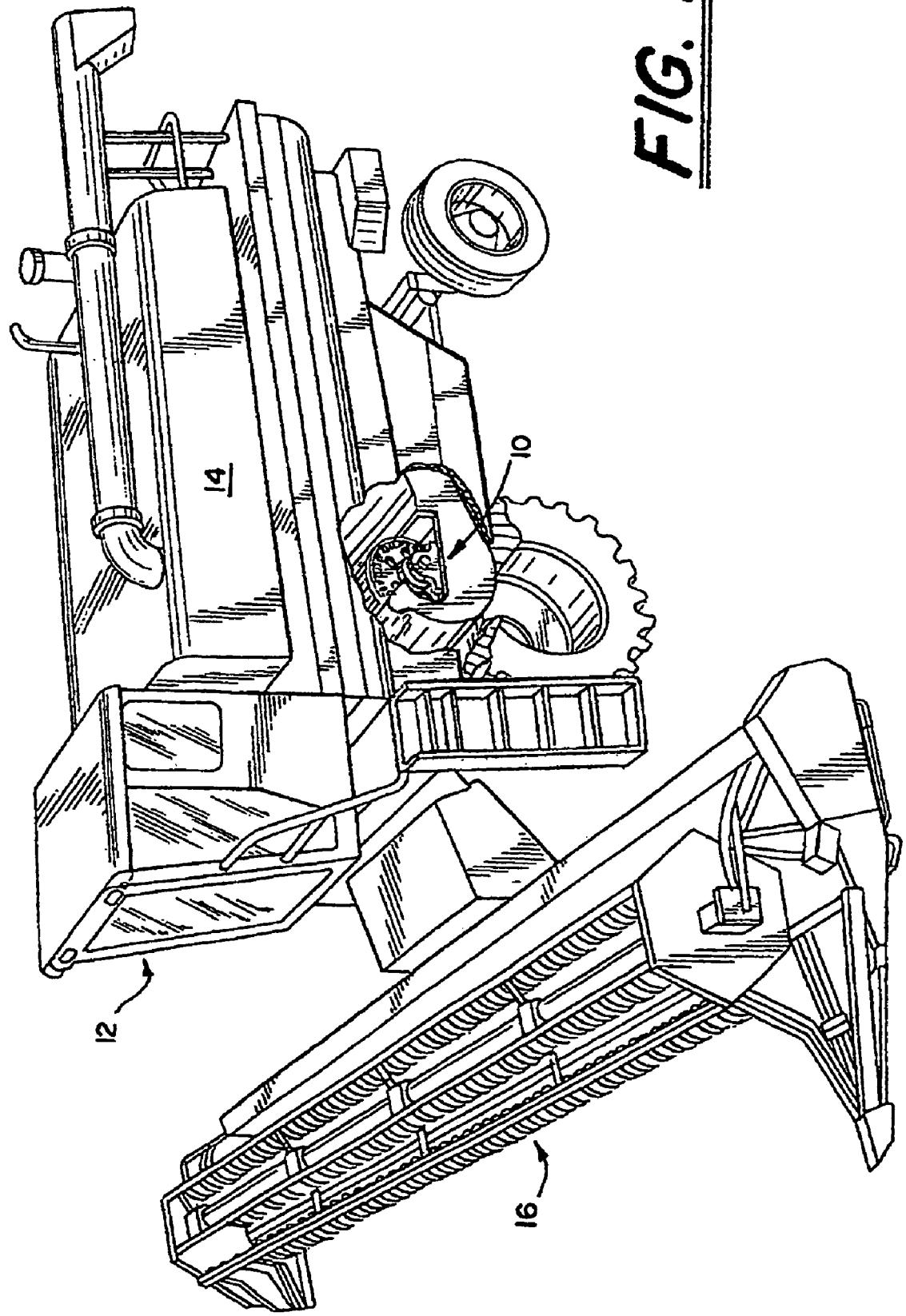
FIG. 1 a perspective view, partially broken away, of a combine harvester in which the present invention is useful.
Figure 2:
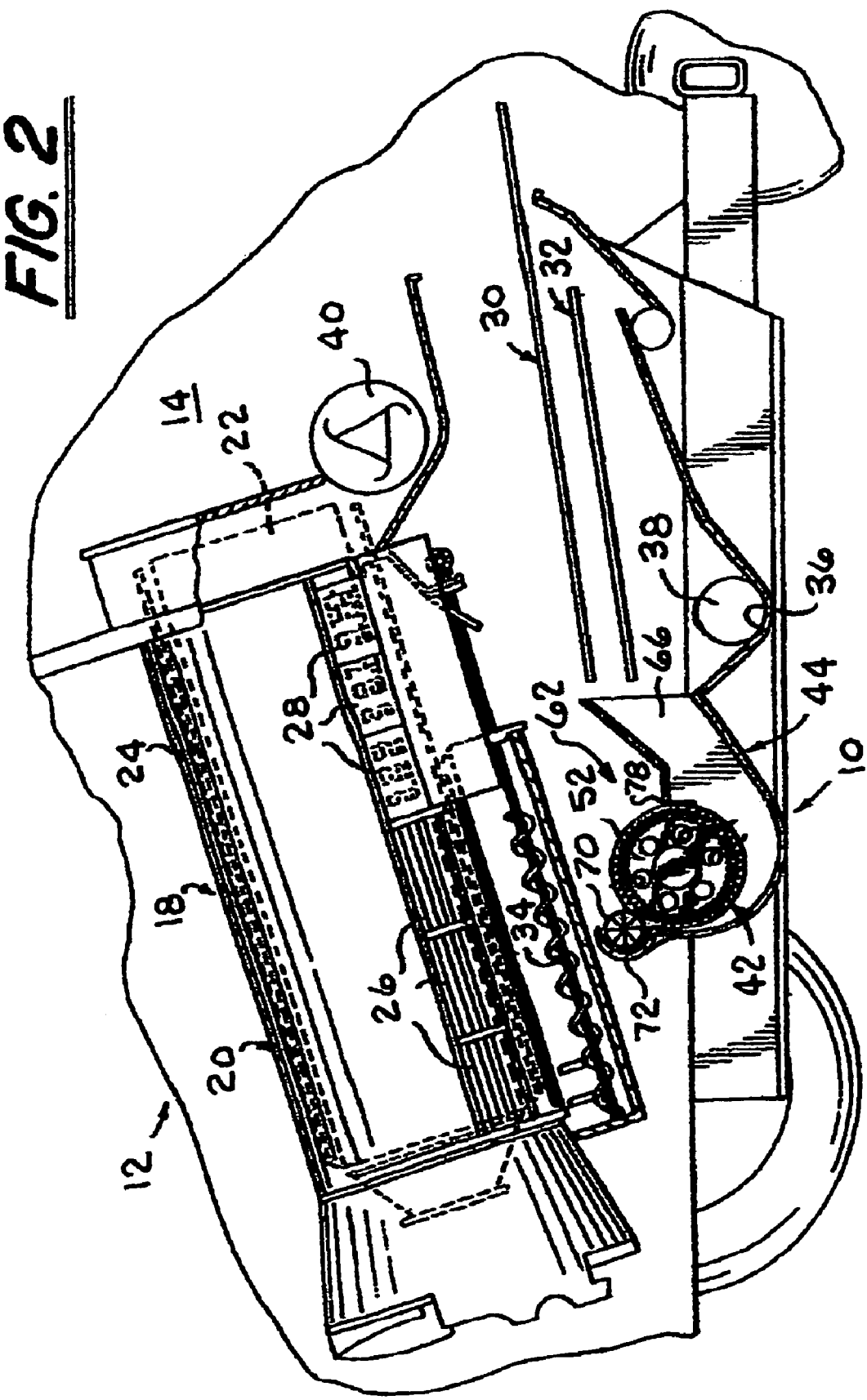
FIG. 2 is a cross-sectional view showing a threshing apparatus and cleaning system of the combine harvester.

Referring now to the drawings, wherein like reference numerals indicate like parts throughout the several views. FIGS. 1 and 2 illustrate a fan assembly 10 according to the present invention arranged in operable combination with a conventional self-propelled agricultural combine harvester 12 of the axial-flow type, wherein crop material is threshed and separated while it is advanced by and along a longitudinally arranged rotor. It should be appreciated, however, that the principles and teachings of the present invention equally apply to fan assemblies that are used in conventional and dual rotor threshing systems used in other agricultural combines or in other applications.

The self-propelled combine harvester is operatively powered by an engine (not shown) suitably housed within a body 14 of the combine harvester to provide driving power. The transfer of rotation and power from the engine to various driven components of the combine is of a conventional nature and could include fixed or variable belt or chain drives which are not shown for purposes of clarity.

At its front end, combine harvester 12 is provided with a conventional crop harvesting header 16. The choice of header, of course, does not limit or relate to the present invention. The crop harvesting header 16 cuts and directs crop material into a conventional threshing apparatus 18 (FIG. 2). As is well known in the art, the threshing apparatus includes a rotor assembly 20, including a relatively large diameter rotor 22 that is mounted within a threshing cage 24. Disposed about the cage 24 is a simple system of concaves 26 and separating grates 28 which, through the action of the rotor 22 and centrifugal force, act to separate grain from the straw and deliver such material to a pair of vertically spaced apart cleaning sieves 30 and 32. In the embodiment shown, auger 34 moves grain to the cleaning sieves 30 and 32 defining part of a cleaning area on the combine. One such example is described in U.S. Pat. No. 5,599,162, herein incorporated in its entirety by reference.

The sieves 30 and 32 are mounted for oscillation to separate the grain from the tailings. The oscillation of the sieves 30 and 32 arranges the tailings received from the threshing apparatus 18 in a relatively large crop mat or veil extending across substantially the entire sieve. The heavier grain falls through the sieves 30 and 32 to a clean grain collector 36. An auger 38 directs the grain from the collector 36 into a hopper or grain bin (not shown) often housed generally directly behind the cab 12 within combine harvester body 14. Material which is too large to pass through the concaves 26 and grates 28 (chaff) is propelled rearwardly through the rotor assembly 20. A conventional beater 40 acts upon the chaff discharged from the rotor assembly 20. Beater 40 propels straw and chaff from the rear of the rotor assembly 20 and throws it back for broad discharge from the rear end of the combine.

Figure 3:
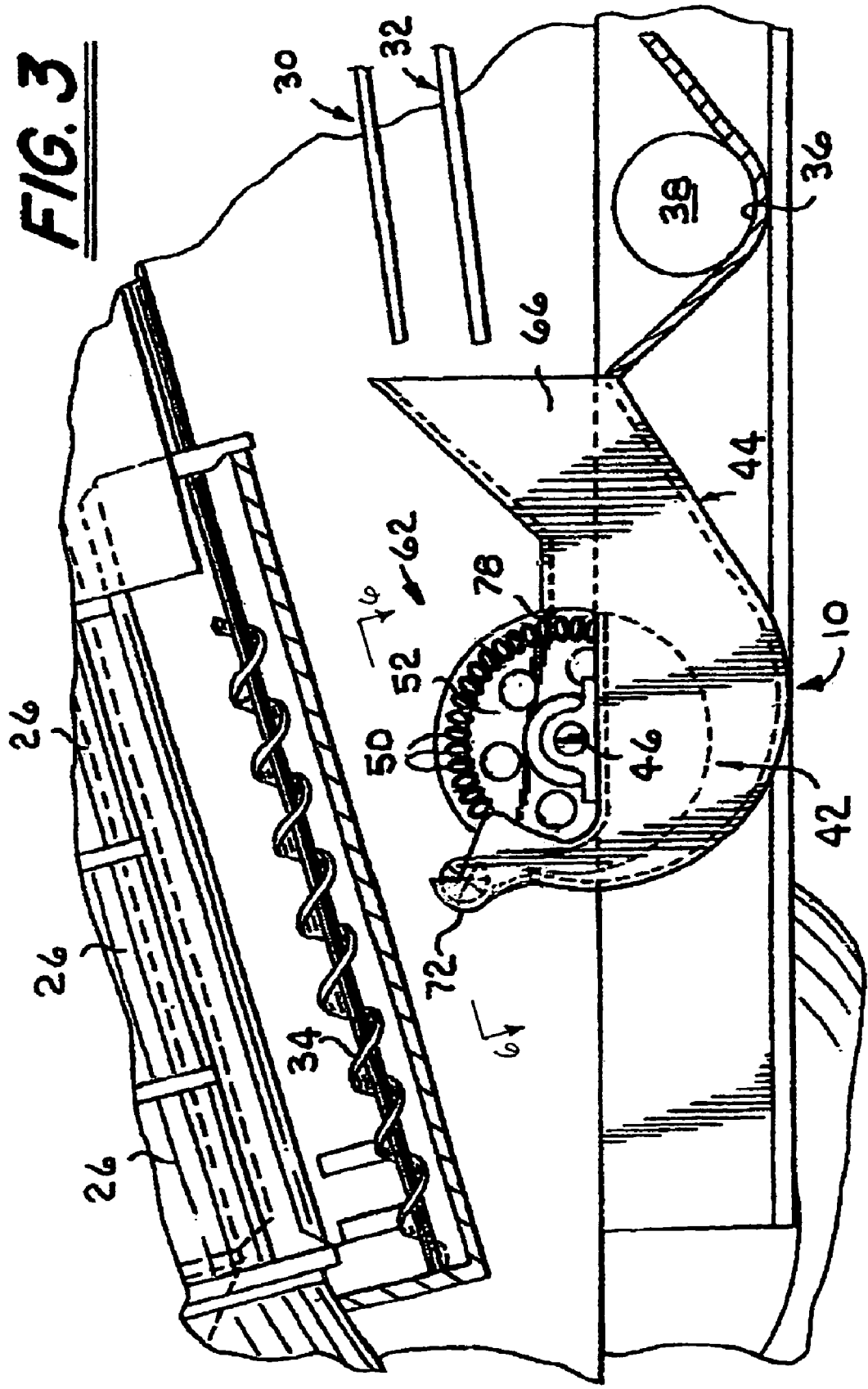
FIG. 3 is an enlarged cross-sectional view of the cleaning system of the combine harvester.

Referring now to FIG. 3, fan assembly 10, constructed in accordance with the present invention, is arranged in combination with the cleaning sieves 30, 32. The fan assembly 10 comprises an elongated transverse or cross flow fan 42 and an air plenum 44. Fan 42 extends transversely across substantially the entire width of the combine harvester 12. More specifically, fan 42 is transversely mounted on the combine harvester 12 beneath the threshing apparatus 18 and preferably forward of the cleaning sieves 30, 32.

Air plenum 44 extends parallel to and along substantially the entire length of the fan 42. The air plenum 44 is preferably fabricated from an air impervious material such as steel or the like and defines an elongated air inlet opening 62 and an elongated air outlet opening 66. Air enters the plenum through air inlet 62 and is discharged therefrom through air outlet 66 toward the cleaning sieves 30, 32 whereupon it passes through the sieves to carry chaff from the combine. Advantageously, the air plenum 44 wraps about and extends across the front of the fan 42 to protect the fan blades 50 from being damaged by rocks and other debris that are present in the field as the combine moves thereover. Air inlet 62 is bounded transversely by baffle edge 78 and inlet rotor housing 72. The direction of rotation of fan 42 is from baffle edge 78 toward inlet rotor housing 72. Inlet rotor 70 is rotatably disposed along rotor axis 74 within inlet rotor housing 72 which provides supportive connection to the plenum or other suitable attachment point to the combine. Rotor axis 74 is parallel to fan axis of rotation 48.

Figure 4:
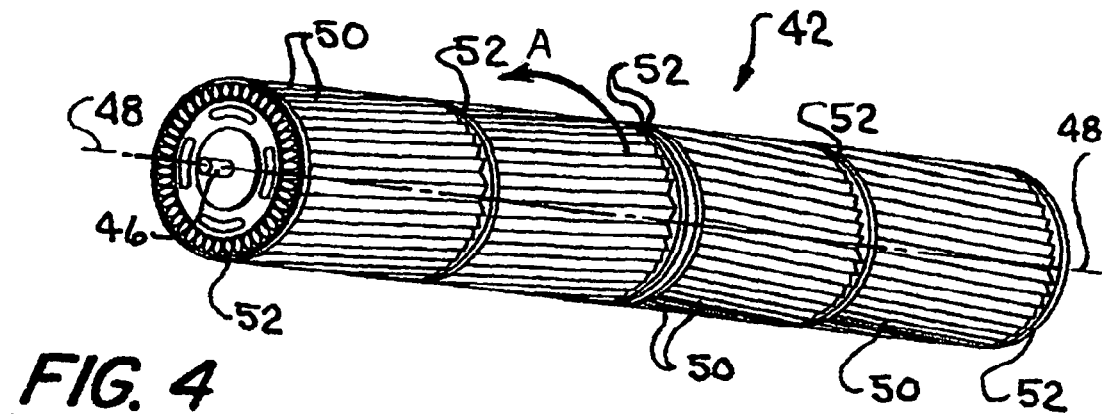
FIG. 4 is a perspective view of a fan rotor assembly according to the present invention.

As shown in FIGS. 3 and 4, fan 42 includes a central and preferably elongated axle 46 defining an elongated axis of a rotation 48 for the fan assembly 10, a plurality of closely spaced fan blades 50 extending axially in a circumferential array or pattern about the axis of rotation 48 to define an open center for the fan 42, and a plurality of axially spaced and aligned fan blade mounting disks 52. The mounting disks are of substantially uniform diameter. Each fan blade mounting disk 52 is connected to and extends radially outward from the axle 46 for driving the fan blades 50, thereby establishing an air flow through the air plenum 44. While mounting disk 52 is shown as having a generally round geometric configuration, it could take any suitable shape, such as, for example, spoke-shaped, star-shaped, and the like. The fan blades 50 have a generally curved cross-sectional configuration and are arranged in closely spaced relation relative to each other. Each fan blade 50 preferably has a forwardly curved cross sectional configuration. A pair of fan blade mounting disks 52 are arranged toward opposite ends of the fan 42. Since the length of the transverse fan 42 is functionally unlimited, other disks 52 may be provided along the length of the fan 42 to counteract centrifugal forces acting on the blades 50 during operation of the fan assembly 10. In a most preferred form the invention, each fan blade 50 is formed from a material such as sheet metal and is connected to the fan blade mounting disks 52. Each fan blade support member 52 is connected to and radially extends from the axle 46.

FIG. 4 shows fan 42 wherein opposite ends of the fan blades 50 are arranged in general axial alignment relative to each other. The center portion of each fan blade 50 is, however, offset in circumferential relation relative to the opposite end thereof such that the fan blade 50 slants or tapers toward a peripheral center portion of the fan whereby each fan blade 50 has a chevron-like configuration and appearance between opposite ends thereof. The chevron "points" in the direction of fan rotation when the fan is operating, shown as arrow "A" in FIG. 4. The resultant flow of air off the blades 50 is directed outwardly toward the fan ends in a manner improving fan performance by lessening end air effects and thereby providing a generally uniform air distribution across the width of the cross-flow fan 42. Angling the fan blades 52 furthermore has proven to reduce operating noise (sound) levels of the fan 42. Accordingly, higher fan speeds can be used to increase the output flow of air from the fan 42 without concern over increasing environmental noise pollution or noise levels can be reduced for when fan speed remains unchanged. Fans in which fan blades 50 are arranged in a cylindrical pattern wherein the blades are in substantially parallel axial alignment with the axis of rotation 48, that is there is no angling of the fan blades 50, are also contemplated and improved by the invention.

Figure 5:
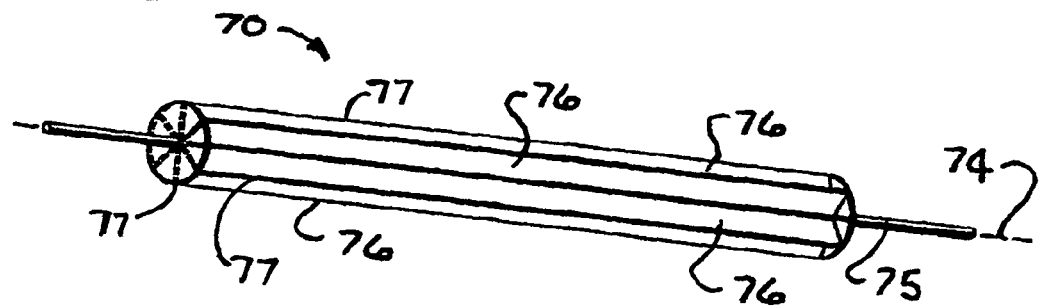
FIG. 5 is a perspective view of a rotating inlet assemble according to the present invention.

Referring now to FIG. 5, inlet rotor 70 is shown extending along rotor axis 74, including shaft 75 which is centered on the rotor axis. A plurality of planar blades 76 connected at one end to shaft 75 and extend in a substantially radially perpendicular direction from said shaft, ending in a distal edge 77. Each planar blade 76 extends a substantially equal distance radially from shaft 75 such that the distal edges 77 define a substantially cylindrical peripheral circumference as the inlet rotor 70 rotates. The planar blades 76 extend axially along the axis of rotation 74 defining the length of the inlet rotor 70, the rotor length being generally equal to the fan 42 length. Shaft 75 extends axially beyond the inlet rotor 70 length, with portions at each opposing end to provide a structure for rotatably connecting the inlet rotor 70 to a support structure, shown in FIG. 6. In the preferred embodiment of this invention, eight planar blades 76 are situated in a substantially uniform radial distribution about shaft 75. Other numbers of planar blades 76 are envisioned, but less than four planar blades 76 diminishes the noted advantages of the invention. Greater numbers of planar blades 76, beyond twelve for example, increase the complexity, and therefore cost of the inlet rotor 70 without appreciable improvement in fan performance or noise reduction.

Figure 6:
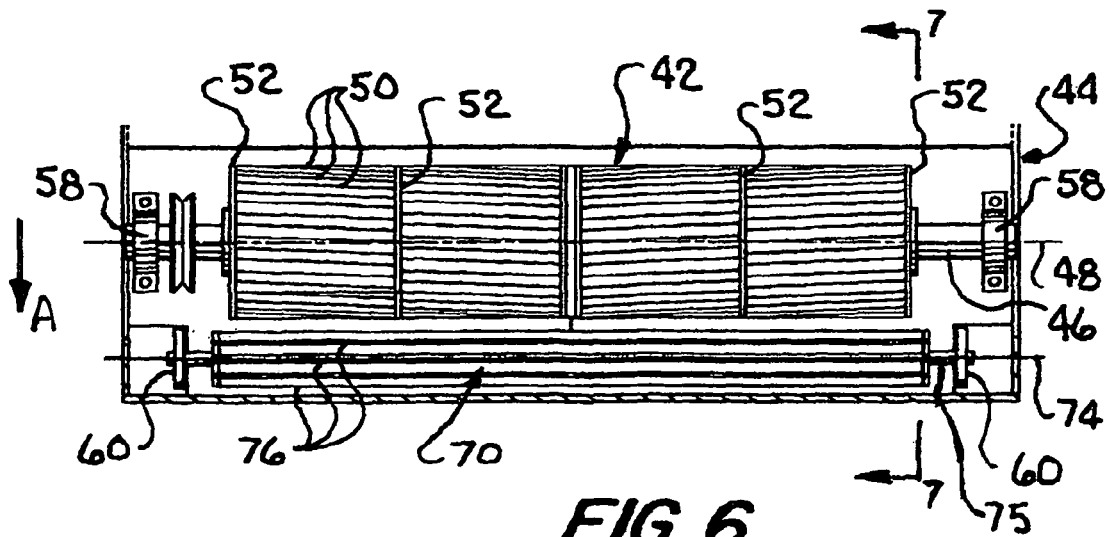
FIG. 6 is a cross-sectional view taken along line 6-6 of FIG. 3 showing the preferred embodiment of the present invention.

Referring now to FIG. 6, fan 42 is supported at opposite ends by axle 46 which is rotatably mounted in bearing blocks 58 secured at opposite open ends of the air plenum 44. The air plenum 44 extends parallel to and along substantially the entire length of the fan 42. Inlet rotor 70 is similarly supported at opposite ends by bearings 60 so that rotor axis 74 is parallel to fan axis of rotation 48 and the outer rotor periphery is situate proximate to the circumference of fan 42. The gap between the periphery of the inlet rotor 70 and the fan 42 must be sufficiently small for the inlet rotor to function as an effective fan cutoff edge. A gap of approximately six millimeters (mm) has been shown effective in one embodiment. The forward portion of inlet rotor 70 is housed within an extension of air plenum 44 so that air flow from the front of the combine is directed upwardly across the face of the air plenum toward air inlet 62 without interacting with the inlet rotor 70. As air flow curves into air inlet 62, it interacts with the exposed planar blades 76 of the inlet rotor as it is drawn into the fan 42, reducing air turbulence at the fan inlet cutoff and thereby reducing noise.

In the preferred embodiment of the invention, inlet rotor 70 rotates freely, driven by the force of air drawing into fan inlet 62 passing planar blades 76. As fan 42 is rotated in the direction shown by arrow "A" in FIG. 6, inlet rotor 70 rotates in an opposite direction. A first alternative embodiment is to power the inlet rotor from the combine engine, rotating the inlet rotor 70 in a direction opposite to the direction of rotation of the fan 42. Regardless of the method by which inlet rotor 70 is rotated, the rotation of inlet rotor 70 causes the inlet opening for fan 42 to be varied thereby avoiding disadvantages of a stationary inlet cutoff edge that leads to noise generation caused by fan operation. As fan 42 rotates, some blades 50 will pass closely adjacent to the distal edge 77 of the inlet rotor planar blades. Other fan blades 50 will pass inlet rotor 70 adjacent to the space between two adjacent planar blades 76. As a fan blade 50 and an inlet rotor planar blade distal edge 77 pass head-to-head (tangentially adjacent), a larger pressure wave is created resulting in more noise compared to the noise generated when a fan blade 50 passes tangentially adjacent to the space between two adjacent planar blades 76. Since the peripheral area of the inlet rotor 70 includes more space between planar blade distal edges 77 than the planar blade distal edges 77 themselves, a passing fan blade 50 is more likely to pass a space than to interact directly with the distal edge 77 of a planar blade 76. When combined with angled fan blades 50, this characteristic of the rotating inlet further reduces noise levels and improves air flow uniformity along the axial length of the fan 42.

Figure 7:
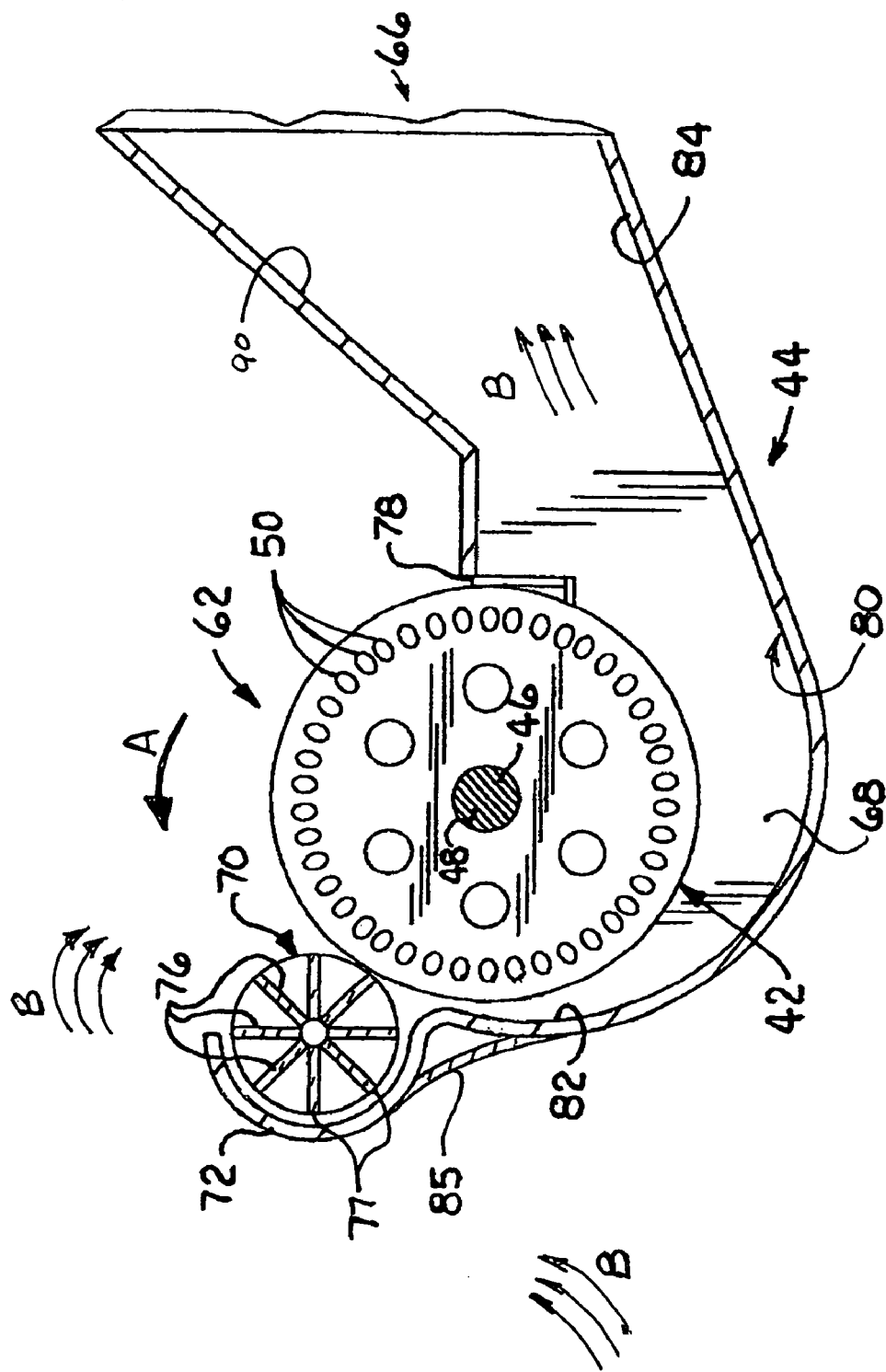
FIG. 7 is an enlarged side elevation view of the fan taken along line 7-7 of FIG. 6.

FIG. 7 shows a section view of air plenum 44, fan 42, and rotating inlet 70. Air plenum 44 further defines an internal chamber 68, wherein the fan 42 is rotatably mounted to drive air between the air inlet and air outlet opening 62 and 68 respectively. Plenum chamber 68 has a cross-sectional scroll-like configuration and includes an upper chamber wall 90 and a lower chamber wall 80. Upper chamber wall 90 spans the width of air plenum 44, bounded forwardly by baffle edge 78 and extending rearwardly therefrom defining the upper portion of chamber 68 to its rearwardmost edge proximal air outlet opening 66. Lower chamber wall 80 includes an upstream curvilinear face 82 and a downstream curvilinear face 84. Upstream face 82 of the chamber wall 80 is curved near the inlet opening 62 to meet inlet rotor housing 72. Upstream face 82 and inlet rotor housing 72 smoothly merge to prevent disruption of air flow entering the fan 42. Air flow direction is indicated by arrows "B" in FIG. 7. The inlet rotor housing 72 wraps around a portion of inlet rotor to direct air flow around the inlet rotor to a position whereupon the air flow curves around the outer surface of plenum 44 and enters fan inlet opening 62. Filler panel 85 is affixed to the outer surface of plenum 44 near the exterior juncture of inlet rotor housing 72 and upstream face 82 of air plenum 44 to further smooth air flow entering the fan. The contour of the forward portion inlet rotor housing 72, filler panel 85, and the exterior surface of the plenum 44 are sufficiently smooth so that air flow from the front of the combine is directed upwardly across the face of the air plenum 44 toward air inlet 62 without interacting with the inlet rotor 70. As the air flow curves into air inlet 62, it interacts with the exposed planar blades 76 of the inlet rotor as it is drawn into the fan 42, reducing air turbulence at the fan inlet cutoff and thereby reducing noise. Inlet rotor housing 72 wraps around approximately half of the inlet rotor circumference so that approximately one-fourth to one-third of the inlet rotor periphery remains exposed to the air flow entering the fan. Chamber wall 80 increases in distance from the periphery of fan 42 as it leads to the downstream face 84 causing air flow to be directed from the fan 42 toward the air outlet opening 66. The downstream face 84 of the chamber wall 70 extends rearwardly and upwardly toward the sieves 30, 32 for directing cleaning air exhausted from the fan 42 thereat.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A transverse fan assembly, comprising:
   a plenum defining an inlet opening and an outlet opening;
   a transverse fan disposed within said plenum directionally rotatable about a first axis of rotation for drawing air in through said inlet opening and discharging air outwardly through said outlet opening; and
   an inlet rotor disposed adjacent said inlet opening, said inlet rotor rotatable about a second axis of rotation and having at least one planar blade, said second axis of rotation being substantially parallel to said first axis of rotation, wherein said transverse fan has blades arranged in a substantially axially cylindrical pattern about said first axis of rotation, that, in rotation, generate a fan periphery, said at least one planar blade being substantially radially perpendicular to said second axis of rotation and having at least one edge distal from said second axis of rotation defining, in rotation, an inlet rotor periphery, said inlet rotor periphery being proximate to said fan periphery, wherein said inlet rotor disposed entirely above said transverse fan such that said inlet rotor periphery is spaced vertically above said first axis of rotation, wherein said plenum further comprises an upper chamber wall and a lower chamber wall, said lower chamber wall having an upstream curvilinear portion adjacent to said inlet opening and a downstream curvilinear portion, said upstream curvilinear portion including a curvilinear inlet housing extending from said upstream curvilinear portion such that said inlet rotor is disposed within said curvilinear inlet housing, wherein said transverse fan assembly is disposed with an agricultural combine having a power source for directionally rotating said fan to discharge air outwardly through said outlet opening, a threshing apparatus, and cleaning sieves arranged in crop receiving relation relative to said threshing apparatus such that air discharge from said transverse fan assembly is directed through said cleaning sieves, wherein air flow entering said inlet opening causes said inlet rotor to rotate.

2. The transverse fan assembly according to claim 1, further comprising a power transfer apparatus interconnecting said power source and said inlet rotor to directionally rotate said inlet rotor in a direction opposite of said fan.

3. The transverse fan assembly of claim 1, wherein said inlet rotor periphery is separated from said fan periphery by about six mm.

4. An improvement for a transverse fan assembly in an agricultural combine, having a plenum, said plenum having an inlet opening and an outlet opening, and a cross-flow fan disposed within said air plenum directionally rotatable about a first axis of rotation for drawing air in through said inlet opening and discharging air outwardly through said outlet opening, wherein said transverse fan has blades arranged in a substantially axially cylindrical pattern about said first axis of rotation, that, in rotation, generate a fan periphery, wherein the improvement comprises:
   an inlet rotor disposed adjacent said cross-flow fan, said inlet rotor rotatable about a second axis of rotation and having a plurality of planar blades each with at least one distal edge from said second axis of rotation defining, by rotation of said inlet rotor, an inlet rotor periphery, said inlet rotor periphery being proximate to said fan periphery, wherein said inlet rotor periphery has planar blade distal edges spaced apart a larger distance than said transverse fan blades, such that said transverse fan blades are more likely to pass between the spaced apart planar blade distal edges than to pass tangentially adjacent with said planar blade distal edges, thereby reducing noise and improving air flow within said plenum, wherein said inlet rotor and said cross-flow fan rotate in opposite directions, wherein said plenum further comprises an upper chamber wall, a lower chamber wall, said lower chamber wall having an upstream curvilinear portion adjacent to said inlet opening and a downstream curvilinear portion, said upstream curvilinear portion including a curvilinear inlet housing extending from said upstream curvilinear portion such that said inlet rotor is disposed within said curvilinear inlet housing, wherein air flow entering said inlet opening causes said inlet rotor to rotate.

5. The improvement of claim 4, further comprising a power source and a power transfer apparatus interconnecting said inlet rotor and said power source, said inlet rotor being rotated by said power transfer apparatus.

* * * * *